United States Patent
Kebsch

[11] 3,979,962
[45] Sept. 14, 1976

[54] BICYCLE GEAR SHIFT DERAILLEUR

[76] Inventor: Alex Kebsch, 8836 SE. 37th, Mercer Island, Wash. 98040

[22] Filed: Dec. 12, 1974

[21] Appl. No.: 531,908

[52] U.S. Cl. .............................. 74/217 B; 74/242; 74/475; 74/527
[51] Int. Cl.² ..................... F16H 7/22; F16H 11/00
[58] Field of Search ................ 74/217 B, 242.14 B, 74/242.15 B, 242.11 B, 489, 501, 531, 535, 475, 527, 242

[56] References Cited
UNITED STATES PATENTS

| | | | |
|---|---|---|---|
| 3,442,148 | 5/1969 | Juy | 74/489 |
| 3,481,217 | 12/1969 | Maeda | 74/535 |
| 3,748,916 | 7/1973 | Morse | 74/217 B |

FOREIGN PATENTS OR APPLICATIONS

| | | | |
|---|---|---|---|
| 889,673 | 1/1944 | France | 74/217 B |
| 601,743 | 5/1948 | United Kingdom | 74/217 B |

Primary Examiner—Samuel Scott
Assistant Examiner—Allan R. Burke
Attorney, Agent, or Firm—Seed, Berry, Vernon & Baynham

[57] ABSTRACT

A parallelogram-type derailleur is provided with a curved guide member or sheave which increases the moment arm of the cable acting on the parallelogram by diverting the direction of pull on the cable 90° and thus results in a longer stroke and less pulling power. A longer stroke is employed advantageously on a hand lever that can be moved through a circular shift range of about 180° so that the hand lever can be moved into various shift positions merely by feel.

8 Claims, 3 Drawing Figures

BICYCLE GEAR SHIFT DERAILLEUR

BACKGROUND OF THE INVENTION

Field of the Invention

This invention pertains to bicycle shift derailleurs of the type commonly employed on multiple-speed, i.e., ten-speed, bicycles and to the hand lever controls for shifting such derailleurs.

Description of the Prior Art

Examples of conventional bicyle gear shift derailleurs of the type which employ a parallelogram linkage for guiding movement of the chain laterally of the bicycle wheel over a plurality of sprockets spaced axially along the axis of the wheel are illustrated in U.S. Pat. Nos. 3,448,628; 3,803,933; and 3,748,916. Typical derailleurs are also shown in French Pat. No. 922,775 and British Pat. No. 601,743. These parallelogram-type derailleurs usually have a short lever arm with which to pivot the parallelogram linkage. The short lever arm requires heavy pulling power and has a tendency to damage the system and stretch the cable. Some derailleurs, such as shown in British Pat. No. 601,743 and French Pat. No. 922,775, have employed lever arms attached to one of the movable links of the parallelogram to increase the pulling moment in an attempt to reduce the pulling power necessary to pivot the parallelogram. An increase in the lever arm on the movable member has meant that the end of the cable is undesirably pivoted through a substantial number of degrees at the guide or end of the sheath of the cable. Also, the lever arm extends out a considerable distance from the parallelogram linkage in an inconvenient manner.

Another disadvantage with prior art derailleurs is that the cable movement has been limited to a very short distance such that when transmitted to movement of the conventional pivotal hand lever at the forward end of the frame of the bicycle, the range of arcuate movement through all five of the sprockets has generally been limited to about 45° to 60°. As a result, the bicycle rider frequently can determine only by visually looking back at the sprockets the exact sprocket on which the chain is lying.

SUMMARY OF THE INVENTION

It is an object of this invention to provide an improved bicycle gear shift derailleur.

It is another object of this invention to provide a parallelogram-type bicycle gear shift derailleur which can be pivoted with a reduced amount of cable pulling power.

It is another object of this invention to provide a parallelogram-type gear shift derailleur in which the pulling power of the cable is at right angles to the parallelogram links and adjacent the distal end of the links.

It is another object of this invention to provide a parallelogram-type bicycle gear shift derailleur which allows for a longer pulling stroke on the cable.

These objects are best obtained by providing on a stationary, relative to the bicycle frame, part of the parallelogram a guide segment or sheave which guides the cable into a position where the pull is at 90° to the end of the parallelogram links, remote from the stationary link. In this manner, the lever arm or pulling torque is increased over that of conventional derailleurs and the direction of pull is applied at the most efficient angle. Furthermore, the increase in lever arm is obtained without the lever arm extending outwardly of the parallelogram linkage where it could become an obstruction or interfere with the operation of the bicycle. As is readily apparent, the increase in the lever arm results in a substantially decreased amount of pulling power necessary to swing the parallelogram through its various shifted positions.

It is still another object of this invention to provide a hand lever control for a bicycle gear shift derailleur which can be moved through approximately 180° of movement in the various shifted positions.

It is another object of the invention to provide a shift control lever for a bicycle gear shift derailleur which can be shifted merely by feel into the various shifted positions.

Basically, this object of the invention is obtained by providing a detent between the pivotal hand lever and a stop plate on the bicycle frame and spacing the stops about the pivot axis of the hand lever a substantial number of degrees, for example, 90° to 180°. Preferably, the stops are initially spaced greater distances than the latter stops so that cable slack can be removed between the first and second stops. The wide range of movement allows the operator to feel for the correct gear shift position and to remove slightly off shift conditions within the range of each stop merely by making a finer adjustment within the stop in response to sounds from the derailleur.

DETAILED DESCRIPTION OF THE PREFERRED EMBODIMENTS

Figure 2:
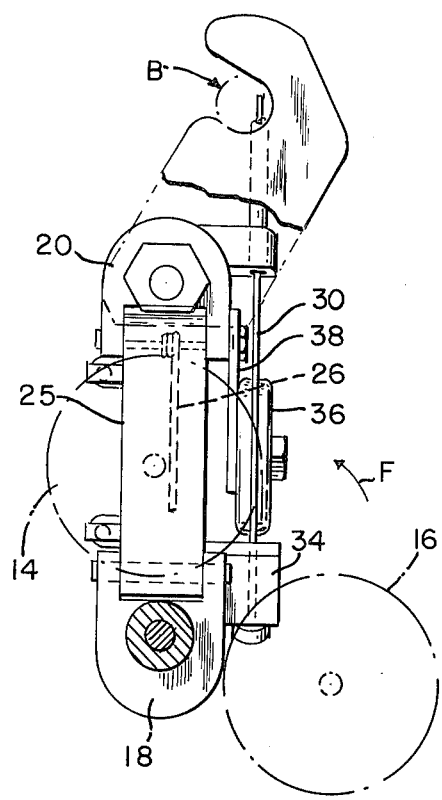
FIG. 2 is a vertical section taken along the line 2—2 of FIG. 1, with parts also illustrated in phantom.

The derailleur illustrated in the drawing is of the type manufactured by Prestige-Simplex, France; however, any of the conventional parallelogram-type derailleurs presently on the market or illustrated in the illustrative above-mentioned patents, for example, U.S. Pat. No. 3,362,238 or Frence Pat. No. 922,775, can be employed. This type of derailleur is generally mounted on the axle bolt 10 of a bicycle frame B. Mounted on the hub of the wheel of the bicycle are a plurality of sprockets S of different diameters, generally five in number, but which can be less, as shown in U.S. Pat. No. 3,362,238, or more. The derailleur is generally provided with a support frame 12 that carries a guiding roller or sprocket 14 and a tensioning roller or sprocket 16. As is well known, the support frame is pivotally mounted on a housing 18 which forms a movable link opposite a fixed link 20 of the parallelogram P. The housing 18 contains a spring which biases the support frame in the direction F, as shown in FIG. 2, to maintain tension on the chain of the bicycle as it is carried on the sprocket S and guide and tensioning rollers.

Figure 1:
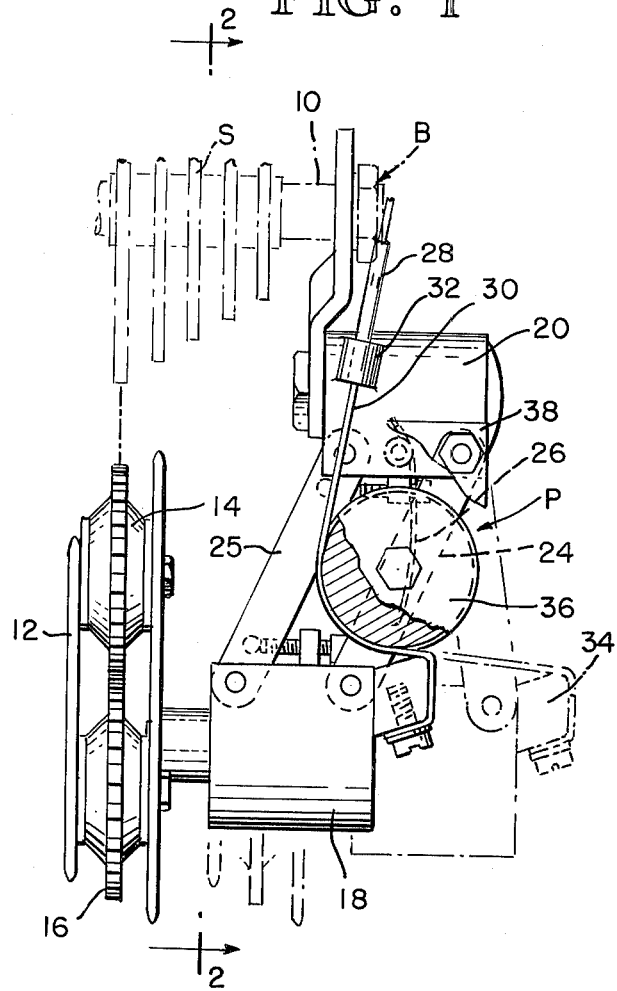
FIG. 1 is a rear elevational view of a bicycle gear shift derailleur embodying the principles of the invention, with part broken away for clarity.

The derailleur parallelogram P is also conventionally provided with a pair of pivotable parallel links 24 and 25 which are biased by a spring 26 to the right in the preferred embodiment, as shown in phantom lines in FIG. 1. A bowden-type cable having a sheath 28 and a cable or wire 30 is provided, with the sheath terminating in a socket 32 fixed to the fixed link 20.

It is a unique feature of this invention that the cable is ended on an extension arm 34 which is formed integrally with or otherwise connected to the end of the movable opposite link 18. Also provided is a rotatable sheave 36 that is pivotally mounted on a plate 38 that is fixed to the stationary link 20. The cable 30 is entrained over the sheave 36 such that the pulling force acting on the opposite link 18 is at substantially right angles to the ends of the movable links 24 and 25. The sheave can also be a stationary curved member, if desired. The sheave 36 increases the lever arm and provides the pulling force at an optimized location without substantially extending the cable or the sheave 36 from under the fixed link 20. Thus the pulling force may be reduced in a manner which is quite compact.

Figure 3:
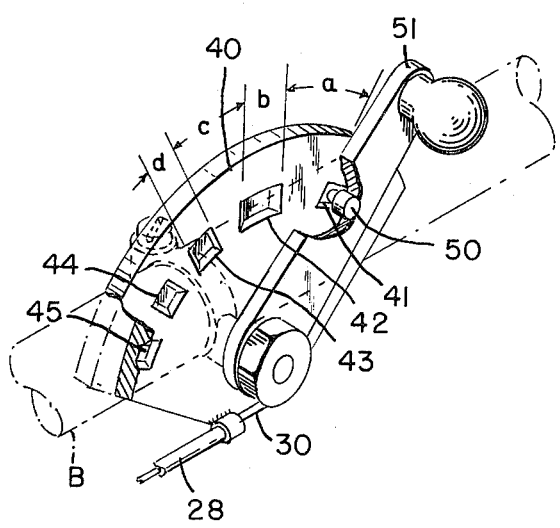
FIG. 3 is a schematic isometric of the hand lever control for the derailleur shown in FIGS. 1 and 2.

As is readily apparent, movement of the cable results in movement of the opposite link 18 and thus the support frame 12 in a ratio of approximately 1:1. This increased movement over conventional derailleur systems results in a substantially increased stroke length or cable movement. This increased stroke is advantageously used in the hand control, best illustrated in FIG. 3. In the hand control, a stationary stop plate 40 is secured to the bicycle frame B and is provided with a plurality of stop abutments or notches 41–45. Each notch has a sloped forward and rear surface to smoothly receive a spring-biased detent 50 mounted on a pivotable hand lever 51. A cable 30 is secured to the hand lever and, as is readily apparent, movement of the hand lever counterclockwise, as viewed in FIG. 3, will move the detent along through the notches 41–45, pulling the cable 30 and thus moving the support frame 12 and chain laterally over the sprockets S.

The spacing between the first notches 41 and 42 is represented by the letter a and is considerably greater than the spacing c between all subsequent notches 42–45. Likewise, the length of the slot 42, indicated by b, is slightly greater than the length of each subsequent notch, represented by d. The wider space a allows slack in the cable 30 to be taken up during movement of the lever from slot 41 to notch 42. The greater length of the notch 42 provides a wider range of fine adjustment to compensate for any additional slack which may have occurred due to improper adjustment of the cable tension and its length. As is readily apparent, the amount of pivotal movement of the lever 51 to go from the innermost sprocket position to the outermost sprocket position is approximately 180°. This long stroke enables the slots to be used to provide a rough adjustment for positioning the hand lever. Fine adjustment is then obtained by listening to the characteristic rubbing action which occurs when the derailleur is not exactly aligned over a sprocket. The rough adjustment, however, enables the positioning of the hand lever solely by touch or feel since the detent entering and leaving the notch requires a distinctly increased amount of force over merely moving the detent along the smooth surface of the plate 40.

While preferred embodiments of the invention have been illustrated and described, it should be understood that variations will be apparent to one skilled in the art. Curved segments or pulleys can be used to change the direction of pull. Also, the pull can be in either operating direction of the parallelogram, that is, where the spring return is toward high gear, the cable pull can swing it toward low gear, and when the spring return is toward low gear, the cable pull can swing it toward high gear. The choice of pull direction, of course, is primarily dependent on the manufacturing requirements and the desirability of providing the most compact derailleur mechanism. Accordingly, the invention is not to be limited to the specific embodiments illustrated.

The embodiments of the invention in which a particular property or privilege is claimed are defined as follows:

1. A derailleur mechanism for use with a free wheel of a bicycle for shifting a chain between sprockets of said free wheel, said mechanism comprising:
   a parallelogram having four pivotally interconnected links including a fixed link, an opposite link and two interlinks;
   means mounting said fixed link in said parallelogram in fixed position relative to the frame of said bicycle, each of said interlinks being connected to both said fixed link and said opposite link so as to enable said opposite link to move in a plane which is substantially parallel to the axis of the free wheel;
   guiding and tensioning sprockets supported by said opposite link for movement therewith;
   means for swinging said opposite link including a cable coupled to said parallelogram for swinging said opposite link in said plane; and
   guide means stationary with respect to said fixed link and having a curved cable engaging surface positioned adjacent said opposite link for guiding the cable into a path parallel to said opposite link thereby providing a substantially equal relationship between movement of the cable and movement of said opposite link.

2. The derailleur mechanism of claim 1, said means for swinging said opposite link including a hand lever pivotally mounted to said bicycle frame and a stop plate fixed to said frame, said stop plate having a plurality of stop abutments spaced along an arc concentric to the pivot axis of said hand lever, and detent means on said hand lever engagable with said stop abutments for positioning said cable and thus said guiding and tensioning sprockets relative to said free wheel sprockets.

3. The derailleur mechanism of claim 2, the number of said stop abutments being equal to the number of free wheel sprockets, and the arcuate distance between the farthest apart of said stop abutments being at least 90°.

4. The derailleur mechanism of claim 3, the arcuate distance between the farthest apart of said stop abutments being about 180°.

5. The derailleur mechanism of claim 3 wherein said cable is slack when the detent means of said hand lever engages a first stop abutment at one end of said stop abutments, and wherein the arcuate distance between said first stop abutment and a second stop abutment adjacent said first stop abutment is greater than the arcuate distance between all other stop abutments whereby slack in the cable is taken up during movement of the hand lever between said first and second stops.

6. The derailleur mechanism of claim 5, said stop abutments including arcuate slots, the arcuate slot of said second stop abutment being greater than all remaining slots whereby a greater range of adjustment is available in said second slot for compensating for cable slack.

7. The derailleur mechanism of claim 2, said stop abutments including arcuate slots, the arcuate slot of said second stop abutment having an arcuate length greater than all remaining slots whereby a greater range of adjustment if available in said second slot for compensating for cable slack, each of said slots being of a length sufficient to provide slight cable movement within the slot to accurately provide a fine adjustment of the chain on the desired free wheel sprocket.

8. A derailleur mechanism for use with a free wheel of a bicycle for shifting a chain between sprockets of said free wheel, comprising:

a parallelogram having four interconnected links, including a fixed link and an opposite link, means mounting said fixed link in said parallelogram in fixed position relative to the frame of said bicycle, the other links in said parallelogram being pivotally connected to each other and to said fixed link so that said opposite link is movable in a plane which is parallel to the axis of said free wheel;

guiding and tensioning sprockets supported by said opposite link for movement therewith;

a cable connected to said movable opposite link for actuating said parallelogram for shifting said guiding and tensioning sprockets laterally; and cable guide means having a smooth curved surface approximately tangent to both the cable and the movable opposite link for causing the direction of cable pull on said movable opposite link to be substantially parallel to the axis of said free wheel at said opposite link for converting movement of the cable to approximately 1:1 movement of the guiding and tensioning sprockets relative to the cable movement.

\* \* \* \* \*